(12) United States Patent
Bogatz et al.

(10) Patent No.: US 6,283,691 B1
(45) Date of Patent: *Sep. 4, 2001

(54) HEADED FASTENER WITH PRECISELY CALCULATED GROOVE UNDER HEAD TO ACCOMODATE O'RING SEALING MEMBER AS A SELF-SEALING ASSEMBLY

(75) Inventors: Larry J. Bogatz; Diana S. Bogatz, both of Maumelle, AR (US)

(73) Assignee: B & B Hardware, Inc., Maumelle, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/300,879

(22) Filed: Apr. 28, 1999

Related U.S. Application Data (63) Continuation of application No. 08/683,818, filed on Jan. 27, 1998, now Pat. No. 6,231,286.

(51) Int. Cl.⁷ ........................................................ F16B 43/00
(52) U.S. Cl. .......................................... 411/371.1; 411/542
(58) Field of Search ................................. 411/369, 371.1, 411/542, 915

(56) References Cited

U.S. PATENT DOCUMENTS

| | | | |
|---|---|---|---|
| 2,752,814 | * | 7/1956 | Iaia ........................................ 411/542 |
| 3,004,776 | * | 10/1961 | Sebardt ............................. 411/542 X |
| 3,087,370 | * | 4/1963 | Iaia .................................... 411/542 X |
| 3,175,454 | * | 3/1965 | Morse ................................... 411/542 |
| 3,241,422 | * | 3/1966 | Heimovics .......................... 411/371.1 |
| 4,498,680 | * | 2/1985 | Schobbe ............................. 411/542 X |
| 4,701,088 | * | 10/1987 | Crull .................................. 411/542 X |
| 5,006,026 | * | 4/1991 | Estrada .............................. 411/542 X |
| 5,188,495 | * | 2/1993 | Jones, Jr. ........................... 411/542 X |
| 5,342,096 | * | 8/1994 | Bachle et al. ..................... 411/542 X |
| 5,388,941 | * | 2/1995 | Wuenscher ........................ 411/542 X |

FOREIGN PATENT DOCUMENTS

| | | | |
|---|---|---|---|
| 1029622 | * | 5/1958 | (DE) ..................................... 411/369 |
| 142912 | * | 6/1990 | (JP) ..................................... 411/542 |
| 8604966 | * | 8/1986 | (WO) ................................. 411/371.1 |

* cited by examiner

*Primary Examiner*—Suzanne Dino Barrett
(74) *Attorney, Agent, or Firm*—Mark A. Rogers; Gary N. Speed (57) ABSTRACT

A sealing nut is disclosed for sealed engagement with a workpiece. The sealing nut has a nut body having a lower face, and a bore extends through at least a portion of the nut body. A groove is formed in the lower face, the groove having a side wall which extends upwardly from the lower face. At least a lower portion of the side wall slants outward from a remotely disposed axis of the bore as the side wall extends upward from the lower face. A sealing element, such as an O-ring is disposed within the groove. The sealing element has an outer diameter greater than the diameter of the groove at the lower face of the nut body so that the sealing element must be compressed slightly to be fitted within the groove and so that the groove removably retains the sealing element in place without the need for a sealant or glue.

17 Claims, 8 Drawing Sheets

HEADED FASTENER WITH PRECISELY CALCULATED GROOVE UNDER HEAD TO ACCOMODATE O'RING SEALING MEMBER AS A SELF-SEALING ASSEMBLY

CROSS REFERENCE TO RELATED APPLICATIONS

This application is a continuation-in-part of U.S. patent application Ser. No. 08/683,818, filed on Jan. 27, 1998, now U.S. Pat. No. 6,231,286.

BACKGROUND OF THE INVENTION

This invention is directed generally to the fastener arts, but specifically to sealing fasteners having an undercut groove or channel in the underside of a fastener head for accommodating a sealing element, (specifically an o'ring type elastomer) to accomplish sealing engagement with a workpiece having a threaded or unthreaded aperture.

In general sealing fasteners are well known in the art, spurred on by the space age when finding new ways to seal fasteners became a primary focus. Outdated methods such as copper washers, rtv sealant, etc. are still used to seal fasteners in some applications; however, as the sophistication our world increases, the need for reliable methods of sealing fasteners also becomes increasingly more crucial. That is why many of these inferior methods of sealing are gradually being phased out and replaced with more reliable sealing methods. One of the best ways to accomplish this task is to provide a formed groove or channel in a normally flat undersurface of the fastener head to accommodate a sealing element that is held captive in the fastener head, also achieving metal to metal contact with the workpiece and the outer rim of the fastener head. However, all previous designs have not properly calculated the groove in the fastener head. This causes sealing element failure. In static sealing threaded fastener designs, it is crucial that the groove be precisely calculated in depth, volume, angle, and configuration if one hopes to maintain a positive "seal line" between the sealed surfaces. Without a precisely calculated groove design, the sealing element will either compress too much or not compress enough. For example, by using too large a sealing element it will not have enough volumetric space to accommodate it and will, therefore, force the excess volume of the sealing element beyond the groove area, causing the sealing element to extrude and pinch between the screw and the workpiece in a process known as extruding "on the take down face". Another problem associated with previous designs is a process known as compression set. A sealing element must maintain a continuous "seal line" between the sealed surfaces. The establishment of this "seal line" is a function of groove design and sealing element cross section which determines the proper amount of squeeze (compression) on the sealing element. When a sealing element volume is larger than the area sealed, it causes excessive squeeze on the sealing element. This excessive squeeze causes sealing element deformation and loss of seal integrity, therefore rendering the sealing element ineffective. A third problem with previous designs is a process known as installation damage. As the fastener is being assembled to the workpiece, the excessive compression of the sealing element causes it to stick between the end wall surface of the groove in the fastener head and the workpiece, thereby twisting and deforming the sealing element and/or causing sealing element extrusion as previously mentioned. When too small a sealing element is used, there is not enough compression on the sealing element to maintain a continuous "seal line" between the sealed surfaces rendering its sealing capabilities useless. As an additional matter, it is vital that fasteners of this type be cold formed without removal of material from the shank or head portion of the fastener since an alteration of this type weakens the grain flow structure of the fastener in a high stress area and greatly increases the chances of head separation either before or after the fastener is tightened to its proper torque specification. It is extremely important that these fasteners maintain the ability to withstand the stress involved when tightened to normal torque values. The main reason for a modification of this type is that during cold forming or roll forming threading operations there is generally an external screw thread of up to one and one half thread pitches of incomplete thread between the undersurface of the fastener head to where the thread begins on the fastener shank. This unthreaded portion would normally keep the mating surfaces from achieving adequate metal to metal contact thus preventing a positive seal. However, using a smaller diameter cold forming wire than is normally used when manufacturing similar products of the same diameter affords the flexibility necessary to maintain high quality while forming the fastener to the minimum pitch diameter. This in conjunction with limiting the unthreaded length from the head to a maximum of 1 incomplete thread assures a complete metal to metal engagement with a workpiece having a standard size threaded or unthreaded aperture. This eliminates the need for any alterations to the fastener as mentioned above and thereby maintains fastener integrity.

BRIEF SUMMARY OF THE INVENTION

It therefore an object of this invention to provide a novel fastener having a formed groove or channel precisely calculated in depth, volume, angle and configuration to greatly improve reliability and substantially eliminate the problems associated with prior art design.

A more specific object is to provide a fastener with a formed annular groove or channel having a sealing element completely captive in said groove and maintaining a continuous positive "seal line" between the fastener and the workpiece while maintaining a stable metal to metal contact between fastener head and the workpiece.

Another object is to provide a fastener with a formed groove or channel in the shape of a trapezoid precisely calculated in depth, volume, and angle to achieve a predetermined percentage of compression on the sealing element preventing sealing element deformation and assuring sealing element reliability and reusability.

It is another object to provide a fastener with a formed groove or channel in the shape of a parallelogram precisely calculated in depth, angle, and volume like the trapezoidal shaped groove to assures a continuous positive "seal line" in larger clearance hole applications.

It is another object to manufacture a fastener with a formed groove or channel in such a way that assures complete mating of the fastener with the workpiece in metal to metal contact without materially altering the physical dimensions of the fastener, thereby retaining the shear and tension characteristics of the said fastener. This prevents head separation by maintaining the necessary strength to withstand the stress involved with using standard torque values.

It is a related object to provide a fastener with a formed groove or channel of the highest quality, reliability of material, and performance. Our design has eliminated the guess work by precisely designing the fastener to assure confidence in aerospace applications, but at the same time, keeping the manufacturing costs down to make it affordable for all industries.

It is another object to have a design method that is versatile enough to use in similar applications such as nuts & rivets and special product configurations. This allows the flexibility necessary to design new products quickly and easily without excessive cost to the customer and at the same time assuring fastener sealing reliability.

Toward the fulfillment of these and other objects, according to the present invention an annular groove or channel is formed in the undersurface of a threaded or unthreaded fastener head and combined there with a sealing element (o'ring). The fastener is comprised of a vertically disposed externally threaded elongate shank extending from an enlarged fastener head that contains an annular groove or channel substantially similar to the shape of a trapezoid formed in the essentially flat undersurface of the fastener head and combined there with a sealing element (specifically an o'ring type elastomer). The said fastener shank is designed to enter into complete engagement with a mating workpiece having an internally threaded or unthreaded aperture. When threaded the shank of the fastener has a screw thread profile that defines a minimum major or thread crest diameter, a minor diameter or thread root diameter, a pitch diameter, and flanks. The unthreaded portion of the fastener shank directly adjacent to the fastener head would have a maximum length of 1 incomplete thread. The said unthreaded diameter of the fastener shank is in accordance with the minimum pitch diameter as specified by IFI standards. The inner wall surface of the groove or channel begins from the periphery of the pitch diameter and is inclined up and outward concentric with the axis of the fastener shank to a predetermined depth, and there connects with a relatively flat annular end wall surface that extends radially outward concentric with the axis of the fastener shank and parallel to the undersurface of the fastener head. The outer wall of the groove having a decline down and outward concentric with the axis of the fastener shank that ends at the undersurface of the fastener head completing the trapezoidal shaped groove configuration. When used to seal a workpiece having an oversized threaded aperture the enlarged fastener head would be 1 to 5 times larger than the fastener head described above. This fastener head contains an annular groove or channel substantially similar to the shape of a parallelogram formed in the essentially flat undersurface of the fastener head and combined there with a sealing element (specifically an o'ring type elastomer). The shank of the fastener having a screw thread profile that defines a minimum major or thread crest diameter, a minor diameter or thread root diameter, a pitch diameter, and flanks. The said fastener shank is designed to enter into complete engagement with a workpiece having an oversized internally threaded aperture. The said groove has an inner wall surface that begins from the periphery of the theoretical pitch diameter (calculated as the pitch diameter of a fastener having a screw thread 1–2 sizes larger than the threaded aperture to be sealed) and is inclined up and inward frusta-conically concentric with the axis of the fastener shank and there connects with a relatively flat annular end wall surface that extends radially outward concentric with the axis of the fastener shank and parallel to the undersurface of the fastener head. The outer wall of said groove having a decline down and outward frusta-conically concentric with the axis of said fastener shank that ends at the point where the said outer wall meets the undersurface of the fastener head completing the parallelogram shaped groove configuration.

The nut is comprised of a nut body that has an external wrenching portion normally of a conventional hexagonal configuration. The nut body has a nut face surface that is generally planar and normal to the axis of the said nut body. Incorporated through the nucleus of the nut body is a threaded bore. The said threaded bore having a screw thread profile that defines a minor diameter or thread crest diameter, a minimum major diameter or thread root diameter, and flanks. The nut body is designed to enter into complete engagement with a workpiece having an externally threaded stud or screw extruding from a threaded or unthreaded aperture. An annular groove substantially similar to the shape of a trapezoid is formed in the essentially flat nut face and is combined there with a sealing element (specifically an o'ring type elastomer). The said groove has an outer wall surface that begins at a precalculated outer groove dimension and is inclined up and inward frusta-conically concentric with the axis of the threaded bore, there it intersects with the relatively flat axially facing base surface or end wall surface that extends radially inward into the nucleus of the threaded bore concentric with the axis of the threaded bore and parallel to the nut face. As the sealing element is compressed between the end wall surface of the groove and the facing surface of the workpiece the sealing element has a controlled inward radial flow into the threaded bore to connect with the threads of the mating fastener shank.

In an alternate embodiment, the groove of the sealing nut has an outer wall or side wall extending upward from the lower face of the nut body, and at least a lower portion of the side wall slants outward in a direction away from the remote bore axis as the side wall extends upward from the lower face. The groove has an end wall surface or upper wall which is aligned above and substantially parallel to the lower face of the nut body. The side wall extends upward from the lower face of the nut body to the upper wall. The groove has a first diameter at the lower face of the nut body and has a second diameter where the side wall intersects the upper wall, the second diameter being greater than the first diameter so that the side wall slants outward at an angle of approximately 20 degrees from the remote bore axis as the side wall extends upward from the lower face to the upper wall. A sealing element is disposed in the groove.

DETAILED DESCRIPTION OF THE INVENTION

Figure 7:
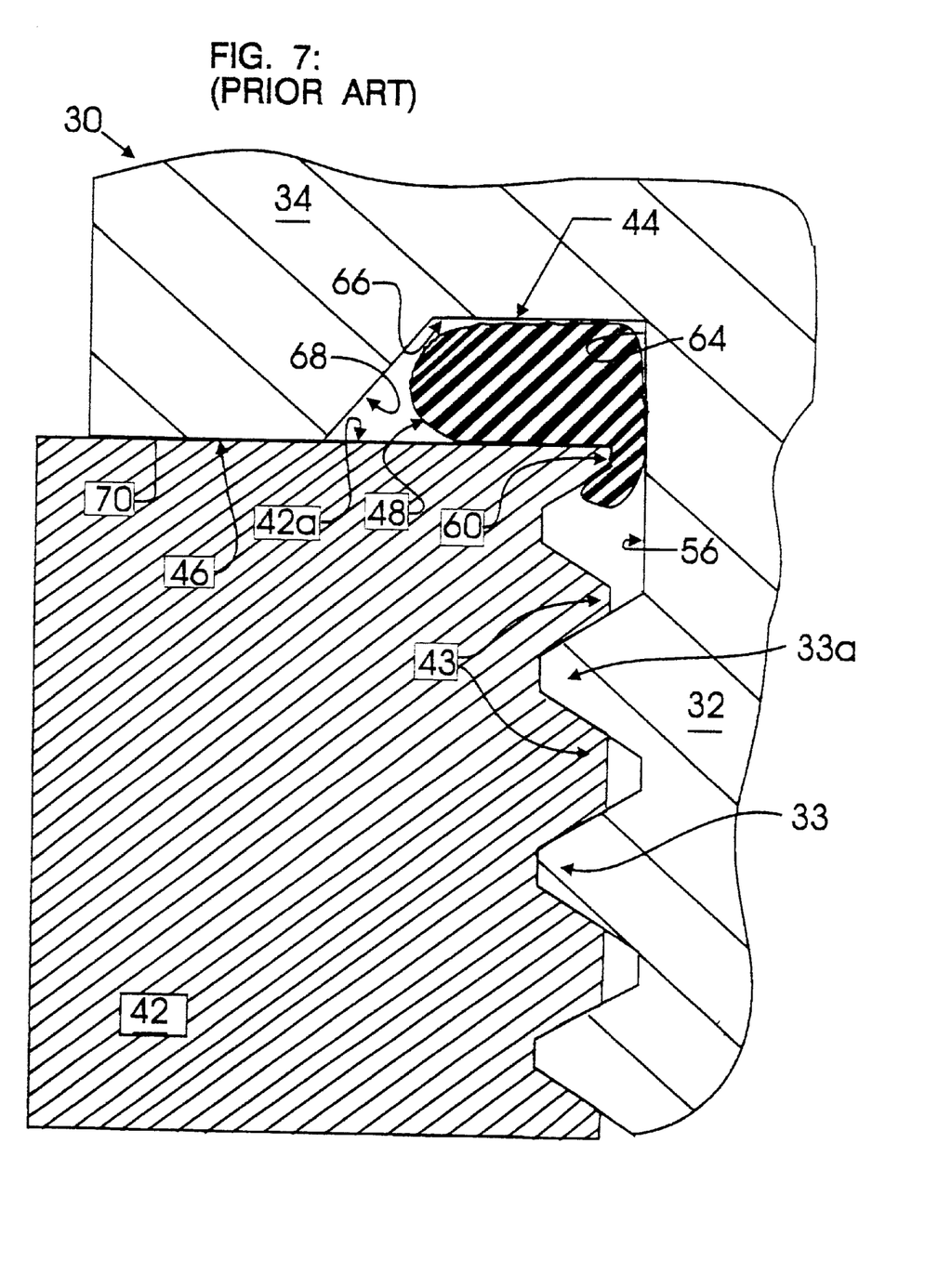
FIG. 7 is an enlarged view of a prior art threaded sealing fastener that illustrates its inability to effectively seal and how its violation of fastener integrity effects the sealing relationship with its mating surface at plete engagement.

Referring now to the drawings and initially to FIG. 7. This undercut sealing threaded fastener in accordance with prior art construction will be described first. The fastener illustrated in FIG. 7 is substantially similar to the fastener construction shown in U.S. Pat. No. 4,701,088 by Crull, to which reference is also invited. It should be noted that the drawings of the Crull patent illustrates an ineffectual sealing fastener assembly. As shown in FIG. 7 removal of material from the fastener shank weakens the grain flow structure in a high stress area, thus when the fastener is tightened to standard torque specifications, head/shank separation is to be expected. The material removal also creates a significant gap between the fastener and workpiece. This in combination with groove angle and o'ring volume larger than the groove volume makes o'ring extrusion and/or o'ring compression set inevitable. However, Crull is considered to be the best prior art.

As shown in FIG. 7 the prior art fastener 30 is in fill engagement with the workpiece 42. Metal has been removed at the area 56 of the fastener shank 32. This was intended to allow the fastener shank 32 to freely advance in relation to the workpiece opening 60. However, it should be noted that this removal of material from the area 56 of the fastener shank 32 disrupts the grain flow structure and weakens the fastener 30 in a high stress area 56. This increases the likelihood of separation between the fastener head 34 and the fastener shank 32 at the unthreaded area 56 when the fastener 30 is tightened to normal torque standards. It should be further noted that in their method of sealing, Crull utilizes a sealing ring 48 preferably a torus in form and defines a volume greater than the volume defined by the undercut groove 44. The material removal from the area 56 of the fastener shank 32 creates a significant gap at the workpiece opening 60 between the area 56 of the fastener shank 32 and the workpiece 42. This material removal at the area 56 in conjunction with the oversized sealing ring 48 and the inner wall 64 angle of the groove 44 shown as 90 degrees from the unthreaded portion 56 into the fastener head 34 at the groove 44 causes the sealing ring 48 to extrude into the gap at the workpiece opening 60 as the fastener 30 is tightened to full engagement with the workpiece 42. When this extrusion occurs it takes away from the volume of the sealing ring 48 in the groove 44. This causes an inadequate "seal line" between the sealing ring 48, the facing surface 42A, and the end wall surface 66. When external pressure is applied to the fastener head 34 the volume reduction increases allowing the fluid or pressure to pass around the sealing ring 48 causing the edges of the o'ring on the low pressure or downstream side of the groove to exhibit a chewed or chipped appearance as the "seal line" is corrupted. This fluid or pressure would follow a path traveling between the workpiece 42 and the fastener 30 more specifically at the point where the annular flat surface portion 70 of the workpiece 42 mates with the undersurface 46 of the fastener head 34 from there traveling up between the sealing ring 48 and the outer wall 68 of the groove 44 then between the sealing ring 48 and the end wall surface 66 and from there traveling down between the sealing ring 48 and the inner wall 64 of the groove 44 and through the workpiece opening 60 between the sealing ring 48 and the relieved area 56 of the fastener shank 32 into the component product that was to be sealed. This sealing ring is incorporated in a groove 44 with the inner wall 64 angle at substantially 90 degrees from the unthreaded portion 56 into the groove 44 and the outer wall 68 angle substantially 45 degrees relative to the axial direction of the fastener shank 32. First it should be recognized that to have an inner wall 64 angle of 90 degrees from the unthreaded portion 56 into groove 44 is impractical and costly to manufacture. It should be further recognized that to have an inner wall 64 angle of 90 degrees from the unthreaded portion 56 into groove 44 and outer wall 68 angle substantially at 45 degrees will cause unequal distribution of the sealing ring volume 48. This in conjunction with the oversized sealing ring 48 causes a problem known as installation damage that occurs when the fastener 30 is fastened to the workpiece 42. The excess volume of the sealing ring 48 is forced out of the groove 44. This in combination with the turning pressure applied to the sealing ring as it is compressed causes the sealing ring 48 to twist at the same time it is pinched between the under surface 46 of the fastener head 34 and the annular flat surface portion 70 of the workpiece 42. Not only does this cause the deformation of the sealing ring 48 compromising seal integrity, it also gives a spongy or false torque reading. This usually results in the fastener head 34 backing away from the workpiece 42 during the product operation. Again it should be noted that by incorporating a sealing ring 48 with a volume larger than the volume of the groove 44 that is to be filled will cause compression set and/or extrusion of the sealing ring 48 as previously described. Discussing now the effects of compression set which is a different variation of the same problem. As previously stated Crull utilizes a sealing ring 48 preferably a torus in form and defines a volume greater than the volume defined by the undercut groove 44. This excess sealing ring 48 volume causes extreme compression (squeeze) on the sealing ring 48 as the sealing ring 48 is compressed between the end wall surface 66 of the groove 44 and the facing surface 42A of the workpiece 42. This extreme compression on the sealing ring 48 stresses the sealing ring 48 beyond its deflection endurance point causing the sealing ring 48 to lose seal integrity. The sealing ring 48 becomes permanently deformed into a flat sided oval shape, the flat sides of which were the original seal interface under compression before failure. This prevents the sealing ring 48 from exerting the necessary compression force to maintain a positive "seal line" between the end wall surface 66 of the groove 44 and the facing surface 42A of the workpiece 42.

Figure 1A:
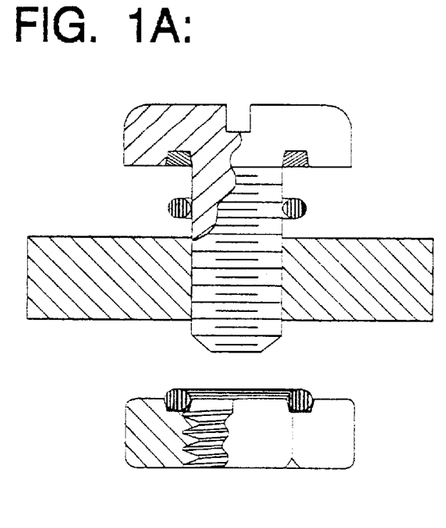
FIGS. 1A and 1B are an illustration of the basic concept of the threaded self-sealing fastener and self-sealing nut as employed in a through hole application.
Figure 1B:
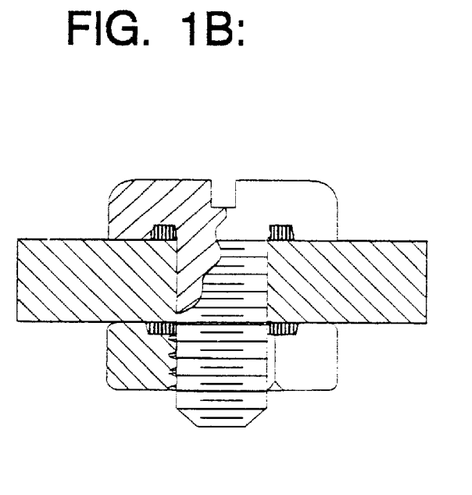
Figure 2:
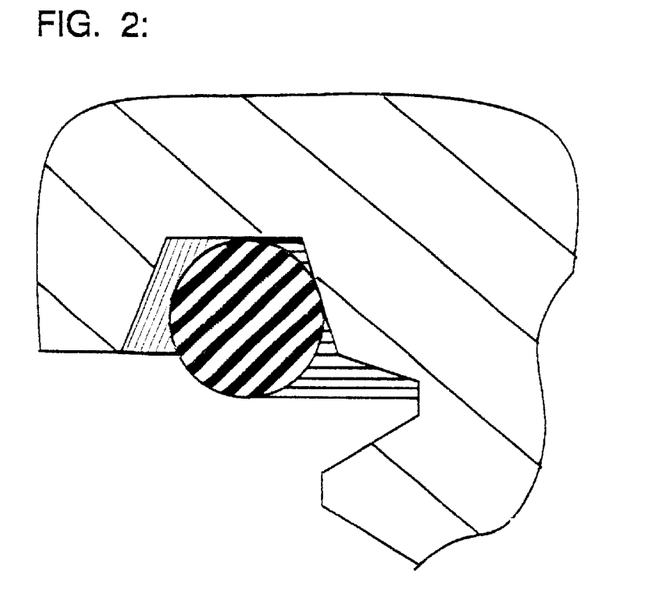
FIG. 2 is a threaded self-sealing fastener showing an enlarged view of the section that illustrates the sealing element in the trapezoid shaped groove prior to engagement with its mating surface.
Figure 3:
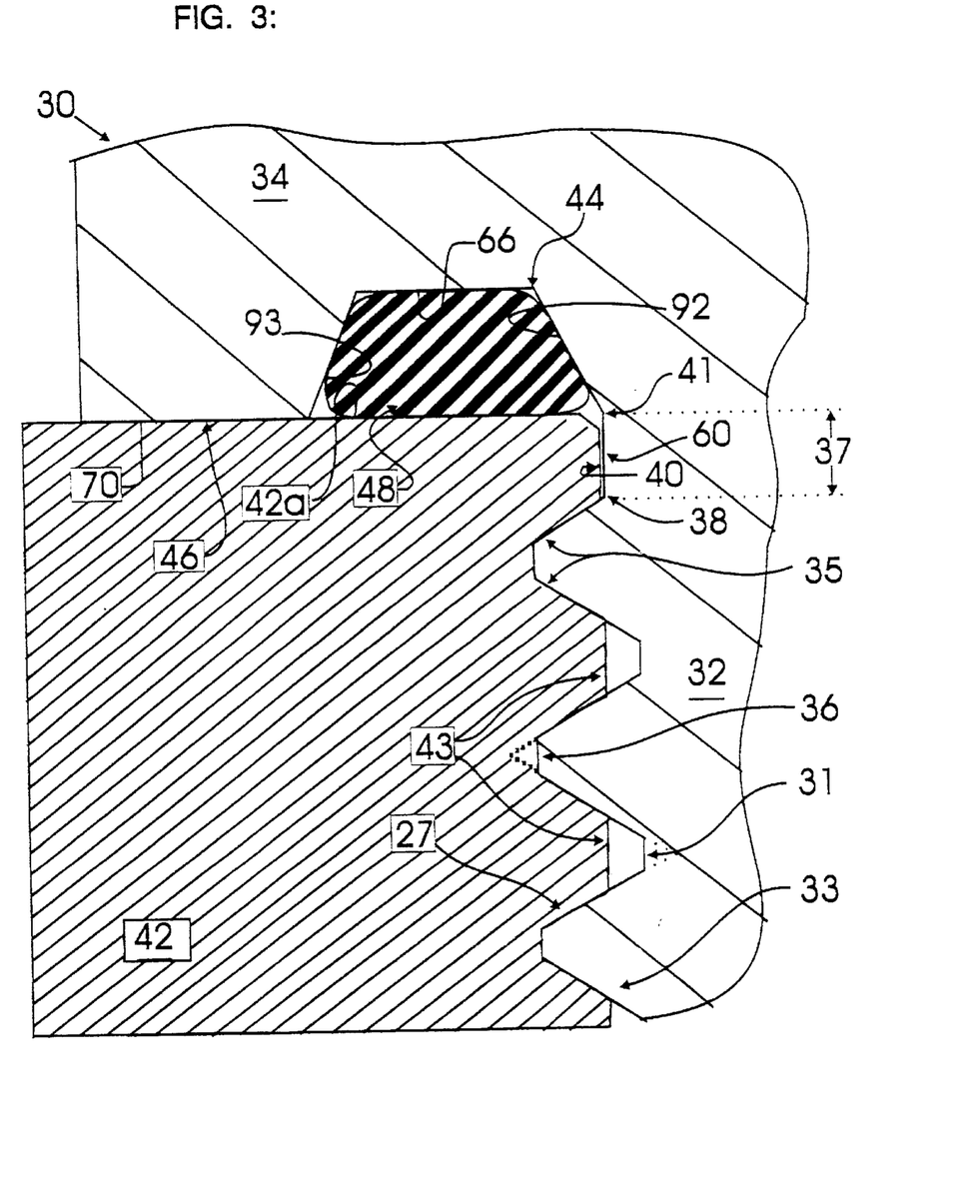
FIG. 3 is an enlarged view of a threaded self-sealing fastener that illustrates the sealing element in the trapezoid shaped groove and the sealing relationship with its mating surface at complete engagement.

Turning now to FIGS. 1A–6. The obvious advantages of our novel threaded and unthreaded self-sealing fastener invention will be fully understood by the following detailed descriptions that demonstrate how the deficiencies of the prior art sealing fastener as illustrated in FIG. 7 have been avoided. FIG. 1 is a full view of the basic concept of the threaded self-sealing fastener and self-sealing nut as employed in a through hole application. FIGS. 2–9 view only a partial section of the self-sealing fastener referenced as number 30. It is to be understood that this fastener 30 may generally be considered as a bolt, screw, or rivet type fastener that is characterized by an elongated shank 32 that extends axially from an enlarged fastener head 34 of a generally cylindrical arrangement that contains an annular groove or channel 44 substantially similar to the shape of a trapezoid formed in the essentially flat undersurface 46 of the fastener head 34 and combined there with a sealing element 48 (specifically an o'ring type elastomer).or as in FIGS. 4&6 a self-sealing nut type fastener 12 that is characterized by a nut body 12 having a threaded center bore 13 through which the threads 28 of a mating fastener shank 75 contact axially, and having an annular groove 44 substantially similar to the shape of a trapezoid formed in the essentially flat nut face 22 that is combined there with a sealing element 48 (specifically an o'ring type elastomer). The head 34 or the nut body 12 may vary considerably in dimension, style, or configuration although the basic concept of the groove 44 design would remain the same. Referring first to the threaded self-sealing fastener 30 with a trapezoidal shaped groove 44 as illustrated in FIGS. 2&3, the fastener shank 32 of the fastener 30 has screw threads defined by reference number 33. These threads 33, define a minimum major or thread crest diameter 36, a minor diameter or thread root diameter 31, flanks 35, a pitch diameter shown generally by reference number 43, and the unthreaded diameter defined by reference number 40. This unthreaded diameter 40 is substantially similar to the minimum pitch diameter as specified by IFI standards. This unthreaded diameter 40 has an unthreaded grip length 37 that begins at the periphery of the pitch diameter 41 directly adjacent to the fastener head 34 and extends axially outward from the fastener head 34 on the fastener shank 32 and ends at point 38 on the fastener shank 32 being a maximum of 1 incomplete thread from the fastener head 34. The self-sealing fastener 30 as shown in FIGS. 2&3 has a fastener shank 32 that is formed with a cold forming wire that is substantially equal with the minimum pitch diameter of the screw. This diameter wire is smaller than the cold forming wire that is normally used when manufacturing similar products of the same diameter. This assures that the fastener 30 will maintain high quality while forming the fastener shank 32 to the minimum pitch diameter. This in conjunction with limiting the unthreaded grip length 37 of the unthreaded diameter 40 on the fastener shank 32 directly adjacent to the fastener head 34 to a maximum of 1 incomplete thread assures that the fastener 30 will achieve a complete metal to metal engagement between the outer rim 70 of the fastener head 34 and the facing surface 42a of the workpiece 42 having an internally threaded aperture with the standard thread run out. This eliminates the need for material removal from the unthreaded diameter 40 of the fastener shank 32 as in the case of prior art design as illustrated in FIG. 7. In addition to being practical and inexpensive to manufacture, our design significantly decreases the gap at the workpiece opening 60 allowing the fastener 30 to achieve a closer tolerance between the fastener shank 32 at the unthreaded diameter 40 of the fastener 30. This in conjunction with precisely calculating the sealing element 48 maximum volume to be substantially similar to the minimum volume of the trapezoid shaped groove 44 allows the sealing element 48 to be held completely captive within the groove 44 and eliminates the possibility of o'ring extrusion between the unthreaded diameter 40 of the fastener shank 32 and the workpiece opening 60 of the workpiece 42. As the fastener shank 32 is brought into engagement with the threads 27 of mating workpiece 42 the sealing element 48 is equally distributed within the groove 44 and the fastener head 34 of the fastener 30 is brought into complete metal to metal engagement between the outer rim 70 of the fastener head 34 and the facing surface 42a of the workpiece 42. Without the removal of material from the unthreaded diameter 40 of the fastener shank 32 the fastener 30 maintains an uninterrupted material grain flow structure. Thus the fastener 30 retains the tensile and tension characteristics necessary to maintain fastener integrity in this high stress area (unthreaded diameter 40) eliminating the danger of head separation when the fastener head 34 of the fastener 30 is tightened into full engagement with the workpiece 42 using standard torque values.

From the periphery of the pitch diameter 41 the inner wall 92 of the groove 44 is inclined up and outward into the fastener head 34 frusta-conically concentric with the axis of the fastener shank 32 substantially in the order of 10 degrees forming the inner wall 92 of the groove 44, at this juncture the inner wall 92 intersects with the relatively flat end wall surface 66. This end wall surface 66 extends radially outward concentric with the axis of the fastener shank 32 and intersects with the outer wall 93 which declines down and outward frusta-conically concentric with the axis of the fastener shank 32 substantially in the order of 10 degrees ending at the undersurface of the fastener head 34, and creating a groove configuration that is substantially similar to the shape of a trapezoid. This trapezoidal shaped groove 44 configuration is incorporated with a sealing element 48 the material of which is generally composed of but not limited to a rubber or rubber based composition and is ideally a torus in cross sectional configuration. The inner wall 92 and the outer wall 93 of the groove 44 enter into the fastener head 34 to connect with the end wall surface 66 substantially equal in wall depth and degree of angle, the wall angles being substantially in the order of 10 degrees. This is vital to assure a proper seating of the sealing element 48 within the groove 44. The maximum sealing element 48 volume is substantially similar to the minimum volume of the trapezoidal shaped groove 44. This in conjunction with the inner wall 92 and the outer wall 93 of the groove 44 being substantially equal in wall depth and degree of angle forces the sealing element 48 to be equally distributed within the groove 44. As the sealing element 48 is compressed to its precalculated rate the sealing element 48 extends radially outward concentric with the axis of the fastener shank 32 being guided and held captive by the inner wall 92 of the groove 44 and the outer wall 93 of the groove 44 forcing the sealing element 48 into a perfect seat within the groove 44 and eliminating the possibility of installation damage as the fastener 30 is brought into complete engagement with the mating workpiece 42. A positive metal to metal engagement is achieved between the outer rim 70 of the fastener head 34 and the facing surface 42a of the workpiece 42. This eliminates sealing element 48 extrusion in this area and prevents the fastener 30 from backing away from the workpiece 42 as the fastener 30 is tightened into full engagement with the relative workpiece 42. Metal to metal contact is also necessary to achieve an accurate torque reading as the fastener 30 is tightened to normal torque specifications. The inside diameter of the sealing element 48 is slightly smaller than the inner wall 92 diameter of the groove 44 where the inner wall 92 intersects with the periphery of the pitch diameter 41 at the base of the groove 44 on the fastener shank 32. This causes the retention of the sealing element 48 in the groove 44 prior to engagement with mating workpiece 42. As previously stated the sealing element 48 is designed not to exceed the volume of the groove 44 by having a maximum sealing element 48 volume that would be substantially similar to the minimum volume of the trapezoidal shaped groove 44, keeping in mind the outward radial flow of the sealing element 48 so that the groove 44 would receive and accommodate the full volume of the sealing element 48. The sealing element 48 is compressed (squeezed) between the end wall surface 66 of the groove 44 and the facing surface 42a of the workpiece 42 to a percentage that is precisely calculated to apply pressure on the sealing element 48 making the sealing element 48 compression a minimum of 25%; this is the minimum compression force necessary to assure a continuous positive "seal line" between all sealed surfaces. A maximum sealing element 48 compression of 40% is necessary to maintain seal integrity. Keeping the sealing element 48 compression below the deflection endurance point of approximately 42% prevents sealing element 48 deformation and also retains the proper seal interface under compression assuring a continuous positive "seal line" between all sealed surfaces, and eliminating the possibility of compression set, as is common with excessive sealing element 48 compression (squeeze) such as is illustrated with the prior art fastener design of FIG. 7. Our design is created to maximize the optimum sealing performance of the sealing element 48, and to maintain seal integrity providing a completely reliable and reusable product.

Figure 5:
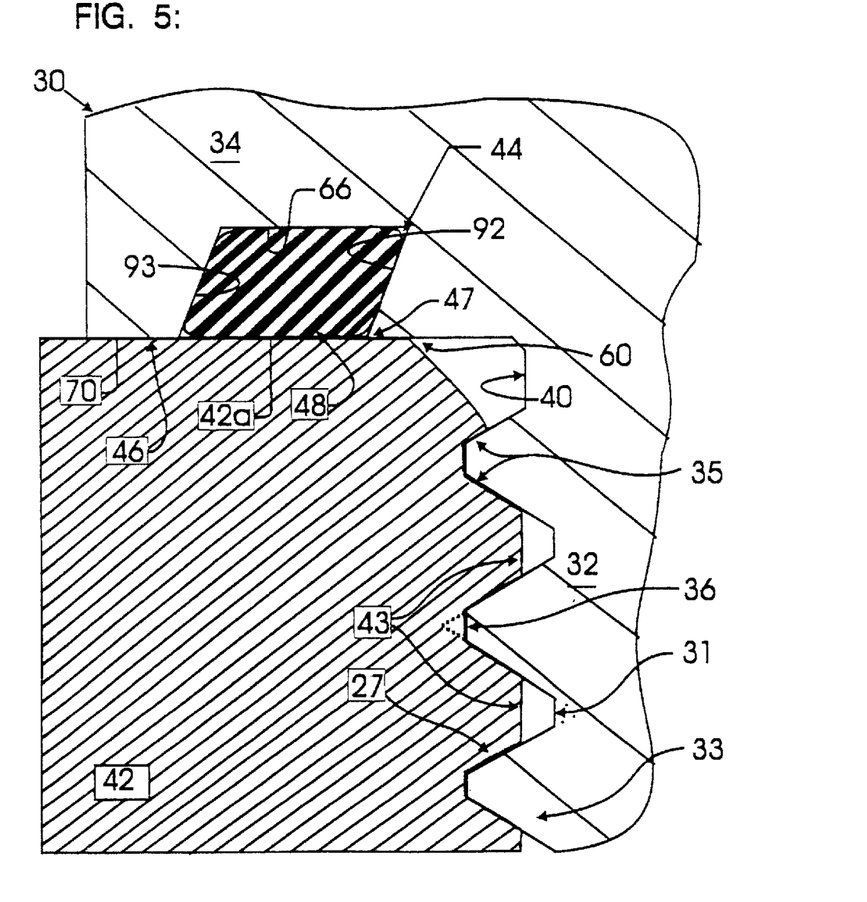
FIG. 5 is an enlarged view of an oversized head threaded self-sealing fastener that illustrates the sealing element the parallelogram shaped groove and the sealing relationship with its mating surface at complete engagement.

Referring now to the threaded self-sealing fastener with a parallelogram shaped groove as illustrated in FIG. 5. This fastener 30 is similar the fastener 30 with the trapezoidal shaped groove 44 as illustrated in FIGS. 2&3. However, the differences and purpose of this fastener will be fully understood by the following description of FIG. 5. This fastener 30 contains a fastener head 34 that may vary considerably in dimension, style, or configuration. This fastener 30 may generally be considered as a bolt, screw, or rivet type fastener that is characterized by an elongated shank 32 that extends axially from an enlarged fastener head 34 of a generally cylindrical arrangement that contains an annular groove or channel 44 substantially similar to the shape of a parallelogram formed in the essentially flat undersurface 46 of the fastener head 34 and combined there with a sealing element 48 (specifically an o'ring type elastomer). The fastener shank 32 of the fastener 30 has screw threads defined by reference number 33. These threads 33, define a minimum major or thread crest diameter 36, a minor diameter or thread root diameter 31, and flanks 35. No reference is made to a pitch diameter since the pitch diameter is not crucial to this design. However, instead of the standard pitch diameter a theoretical pitch diameter is shown and is generally referenced by number 47. This fastener 30 is used primarily in applications where the threaded aperture 60 of the workpiece 42 is oversized to the extent that it would not allow the sealing element 48 in the trapezoidal groove configuration 44, as illustrated in FIGS. 2&3, to achieve a proper seal engagement with the workpiece 42 and therefore a positive "seal line" could not be achieved between the groove 44 in the fastener head 34 and the workpiece 42. To accommodate the parallelogram shaped groove 44 the head 34 size is one to five times larger than the head 34 size of the fastener 30 with the trapezoidal shaped groove 44 as illustrated in FIGS. 2&3 that would normally be used to seal a threaded aperture of this diameter. The inner wall 92 of the groove 44 has an outside diameter that is larger than the outside diameter of the threaded aperture 60. This section is referred to as the theoretical pitch diameter 47. From the periphery of this theoretical pitch diameter 47, the inner wall 92 of the groove 44 inclines up and inward into the fastener head 34 frusta-conically concentric with the axis of the fastener shank 32 substantially in the order of 20degrees into the groove 44, and there intersects with the relatively flat end wall surface 66. This end wall surface 66 extends radially outward concentric with the axis of the fastener shank 32 and parallel with the relatively flat undersurface 46 of fastener head 34 and at this juncture intersects with the outer wall 93 of the groove 44 which declines down and outward frusta-conically concentric with the axis of the fastener shank 32 at an angle substantially in the order of 20 degrees ending at the undersurface 46 of the fastener head 34 creating a groove 44 configuration substantially similar to the shape of a parallelogram. The inner wall 92 and the outer wall 93 enter into the fastener head 34 to intersect with the end wall surface 66 substantially equal in wall depth and degree of angle. The inside diameter of the sealing element 48 is smaller than the theoretical pitch diameter 47. The sealing element 48 is designed to stretch up to 5% upon assembly into the fastener head 34 and snaps securely in place being held captive within the groove 44. This causes the retention of the sealing element 48 in the groove 44 even prior to assembly with the mating workpiece 42. This parallelogram shaped groove 44 configuration is incorporated with a sealing element 48, the material of which is generally composed of but not limited to a rubber or rubber based composition, which is ideally a torus in cross sectional configuration. The inner wall 92 and the outer wall 93 of the groove 44 enter into the fastener head 34 to connect with the end wall surface 66 substantially equal in wall depth and degree of angle, the wall angles being substantially in the order of 20 degrees. This is vital to assure a proper seating of the sealing element 48 within the groove 44. The maximum sealing element 48 volume is substantially similar to the minimum volume of the parallelogram shaped groove 44. This in conjunction with the inner wall 92 and the outer wall 93 of the groove 44 being substantially equal in wall depth and degree of angle forces the sealing element 48 to be equally distributed within the groove 44. As the sealing element 48 is compressed to its pre-calculated rate the sealing element 48 extends radially outward concentric with the axis of the fastener shank 32 being guided and held captive by the inner wall 92 of the groove 44 and the outer wall 93 of the groove 44 forcing the sealing element 48 into a perfect seat within the groove 44 and eliminating the possibility of installation damage as the fastener 30 is brought into complete engagement with the mating workpiece 42.

A positive metal to metal engagement is achieved between the outer rim 70 of the fastener head 34 and the facing surface 42a of the workpiece 42. This eliminates sealing element 48 extrusion in this area and prevents the fastener 30 from backing away from the workpiece 42 as the fastener 30 is tightened into full engagement with the relative workpiece 42. Metal to metal contact is also necessary to achieve an accurate torque reading as the fastener 30 is tightened to normal torque specifications. As previously stated the sealing element 48 is designed not to exceed the volume of the groove 44 by having a maximum sealing element 48 volume that would be substantially similar to the minimum volume of the parallelogram shaped groove 44, keeping in mind the outward radial flow of the sealing element 48 so that the groove 44 would receive and accommodate the full volume of the sealing element 48. The sealing element 48 is compressed (squeezed) between the end wall surface 66 of the groove 44 and the facing surface 42a of the workpiece 42 to a percentage that is precisely calculated to apply pressure on the sealing element 48 making the sealing element 48 compression a minimum of 25%; this is the minimum compression force necessary to assure a continuous positive "seal line" between all sealed surfaces. A maximum sealing element 48 compression of 40% is necessary to maintain seal integrity. Keeping the sealing element 48 compression below the deflection endurance point of approximately 42% prevents sealing element 48 deformation and also retains the proper seal interface under compression assuring a continuous positive "seal line" between all sealed surfaces, and eliminating the possibility of compression set, as is common with excessive sealing element 48 compression. Our design is created to maximize the optimum sealing performance of the sealing element 48, and to maintain seal integrity providing a completely reliable and reusable product.

Figure 4:
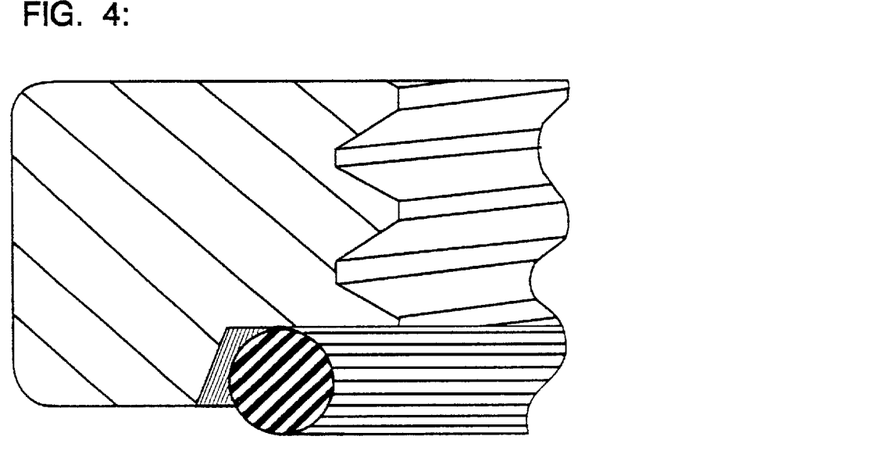
FIG. 4 is an enlarged view of a threaded self-sealing nut that illustrates the sealing element in the trapezoid shaped groove prior to engagement with its mating surface.
Figure 6:
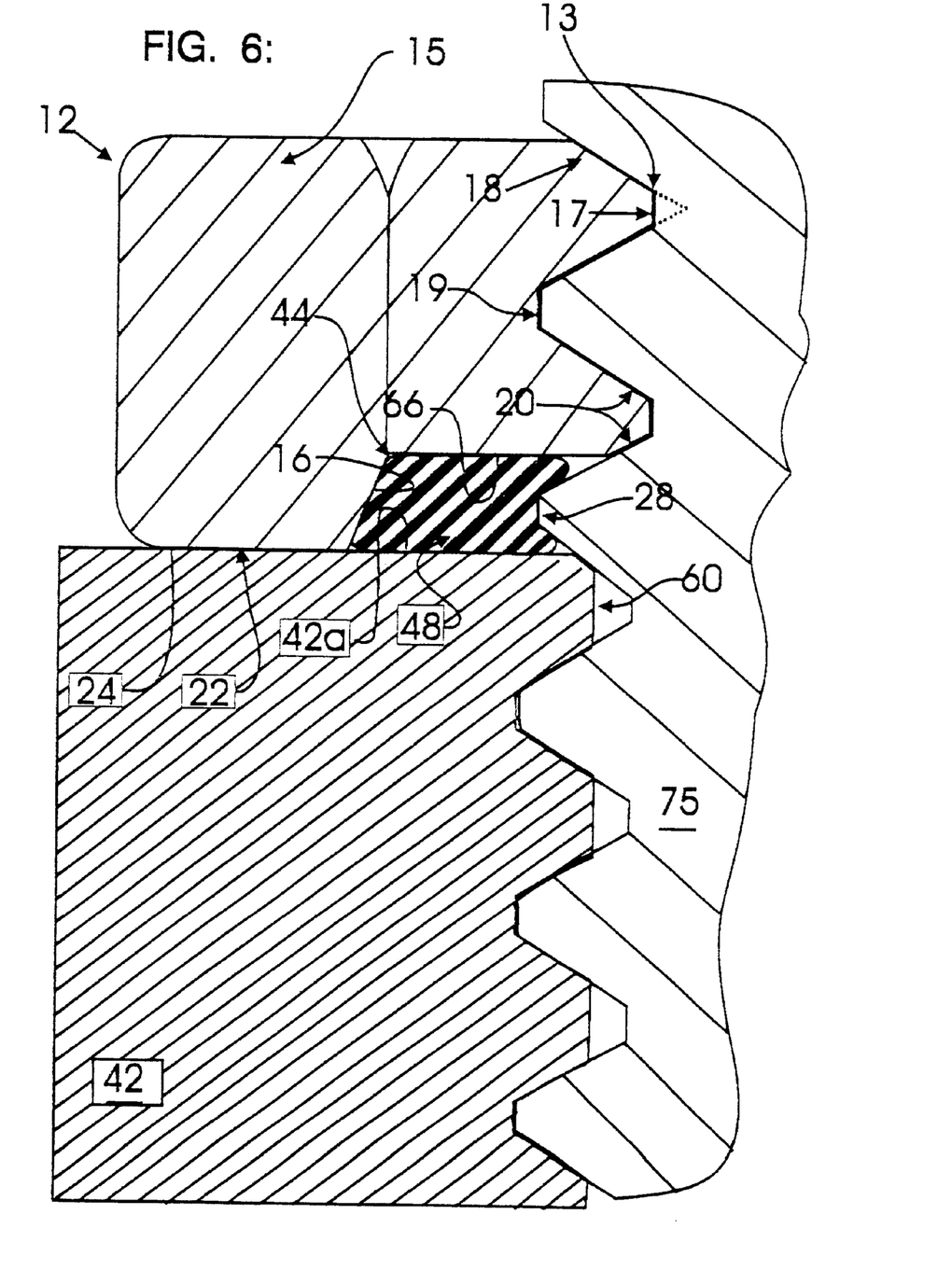
FIG. 6 is an enlarged view of a threaded self-sealing nut that illustrates the sealing element and groove configuration similar to the trapezoidal shaped groove configuration as shown in FIGS. 2 & 3. Also illustrated is the sealing relationship with its mating part at complete engagement.

Referring now to the threaded self-sealing nut as illustrated in FIGS. 4&6 of our drawings. This nut 12 has a groove 44 design similar to that of the trapezoidal shaped groove 44 as illustrated in FIGS. 2&3 previously described. The nut body 12 generally has an external wrenching portion 15 and is normally of a conventional hexagonal configuration. The nut body 12 has a nut face surface 22 that is generally planar and normal to the axis of the nut body 12 and having a threaded bore 13 through the nucleus of the nut body 12. This threaded bore 13 having a screw thread profile that defines a minor diameter or thread crest diameter 17, a minimum major diameter or thread root diameter 19, and flanks 20. The said nut body 12 is designed to enter into complete engagement with a workpiece having an externally threaded shank 75 extruding from the aperture 60 of the workpiece 42. An annular groove 44 is formed in the nut face 22 defined by a frusta-conical radial inward annular wall surface 16 and an axially facing base surface or end wall surface 66. Beginning at the point where the nut face 22 intersects with the outer wall 16 of the groove 44, this outer wall 16 is inclined up and inward substantially in the order of 10 degrees frusta-conically concentric with the axis of the threaded bore 13 penetrating into the nut body 12 forming the outer wall 16 of the groove 44. There it intersects with a relatively flat end wall surface 66. This end wall surface 66 extends radially inward into the nucleus of the threaded bore 13 concentric with the axis of the threaded bore 13 and parallel with the nut face 22. This assures that the entrance of the outward radial flow of the sealing element 48 will completely engage with the threads 28 of the mating fastener shank 75. The inner wall being the threads 28 of the mating fastener shank 75 in conjunction with the outer wall 16 of the groove 44 creates a groove 44 configuration that is substantially similar to the shape of a trapezoid. This trapezoidal shaped groove 44 configuration is incorporated with a sealing element 48 that is bonded to the end wall surface 66 of the groove 44. The sealing element 48 material is composed of but not limited to a rubber or rubber based composition and is ideally a torus in cross sectional configuration. The sealing element 48 volume in this design differs from that of the groove 44 design in FIGS. 2,3 & 5 previously illustrated in that the threads 28 of the mating fastener shank 75 act as the inner wall of the groove 44 as illustrated in FIGS. 4&6 of our drawings. Therefore, this design not only accounts for the volume of the actual groove 44 but also for the volume of the outward radial flow of the sealing element 48 into the threads 28 of the mating fastener shank 75. As the nut body 12 is tightened into full engagement with the mating workpiece 42, the sealing element 48 is guided by the outer wall 16 of the groove 44. As the sealing element 48 is compressed between the end wall surface 66 of the groove 44 and the face surface 42a of the workpiece 42.

The sealing element 48 being held captive by the outer wall 16 of the groove 44 forces the sealing element 48 to extend radially inward concentric with the axis of the threaded bore 13, this forces the sealing element 48 into a perfect seal within the groove 44. At the same time the sealing element 48 having a controlled inward radial flow into the threaded bore 13 achieves a positive seal engagement with the threads 28 of the mating fastener shank 75 and the nut 12 is brought into complete engagement with the mating workpiece 42. A positive metal to metal engagement is achieved between the outer rim 24 of the nut 12 and the facing surface 42a of the workpiece 42. This eliminates sealing element 48 extrusion in this area and prevents the nut 12 from backing away from the workpiece 42 as the nut 12 is tightened to full engagement with the relative workpiece 42. Metal to metal contact is also necessary to achieve an accurate torque reading as the nut 12 is tightened to normal torque specifications. As previously stated this groove design as illustrated in FIGS. 4&6 differs from the groove 44 design in FIGS. 2,3 & 5 previously illustrated in that the threads 28 of the mating fastener shank 75 act as the inner wall of the groove 44 by accounting for the inward radial flow of the sealing element 48 the groove 44 would receive and accommodate the full volume of the sealing element 48. This assures a positive engagement between the sealing element 48 and the threads 28 of the mating fastener shank 75. As this occurs the sealing element 48 is compressed (squeezed) between the end wall surface 66 of the groove 44 and the facing surface 42a of the workpiece 42 to a percentage that is precisely calculated to apply pressure on the sealing element 48 making the sealing element 48 compression a minimum of 25%. This is the minimum compression force necessary to assure a continuous positive "seal line" between all sealed surfaces. A maximum sealing element 48 compression of 40% is necessary to maintain seal integrity. Keeping the sealing element 48 compression below the deflection endurance point of approximately 42% prevents sealing element 48 deformation and also retains the proper seal interface under compression assuring a continuous positive "seal line" between all sealed surfaces, and eliminating the possibility of compression set, as is common with excessive sealing element 48 compression. Our design is created to maximize the optimum sealing performance of the sealing element 48, and to maintain seal integrity providing a completely reliable and reusable product.

Figure 10:
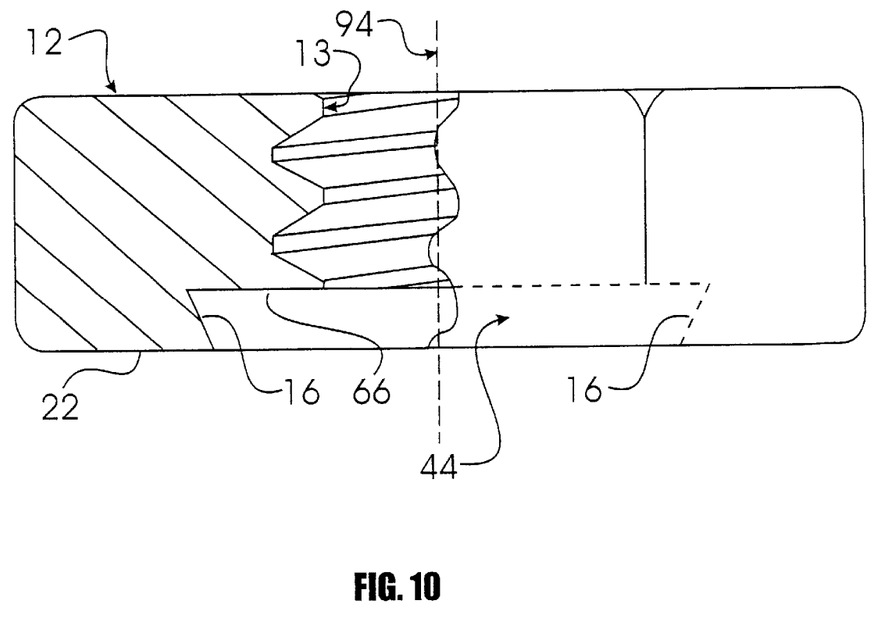
FIG. 10 is an enlarged view of an alternate embodiment of a threaded self-sealing nut of the present invention.

Referring now to FIG. 10 of our drawings, an alternate embodiment of a threaded self-sealing fastener is disclosed. The sealing nut depicted in FIG. 10 is substantially similar to the sealing nuts depicted in FIGS. 4 & 6 and described above with the exception of the outer wall or side wall 16 of the groove 44. The following discusses the groove design of the alternate embodiment depicted in FIG. 10. The nut body 12 has a bore 13 passing through at least a portion of the nut body 12, the bore having an axis 94. The nut body 12 has a nut face or lower face 22 which has a groove 44 formed therein. The groove has an outer wall or side wall 16 extending upward from the lower face 22 of the nut body 12, and at least a lower portion of the side wall 16 slants outward in a direction away from the remote axis 94 as the side wall 16 extends upward from the lower face 22. The groove 44 has an end wall surface or upper wall 66 which is aligned above and substantially parallel to the lower face 22 of the nut body 12. The side wall 16 extends upward from the lower face 22 of the nut body to the upper wall 66. The groove 44 has a first diameter at the lower face 22 of the nut body 12 and has a second diameter where the side wall 16 intersects the upper wall 66, the second diameter being greater than the first diameter so that the side wall 16 slants outward at an angle of approximately 20 degrees from the remote bore axis 94 as the side wall extends upward from the lower face 22 to the upper wall 66. A sealing element 48, omitted from FIG. 10 for clarity, is disposed in the groove. The sealing element 48 has an outer diameter that is greater than the first diameter of the groove 44 so that the sealing element 48 must be compressed slightly, up to approximately 5%, to be fitted within the groove 44 and so that the groove 44 removably retains the sealing element 48 in place without the need for a sealant, glue or bonding agent. It is understood that the groove depicted in FIG. 10 and described above in connection with a sealing nut may be used in connection with the other fasteners described herein, such as with a bolt or rivet.

Figure 8:
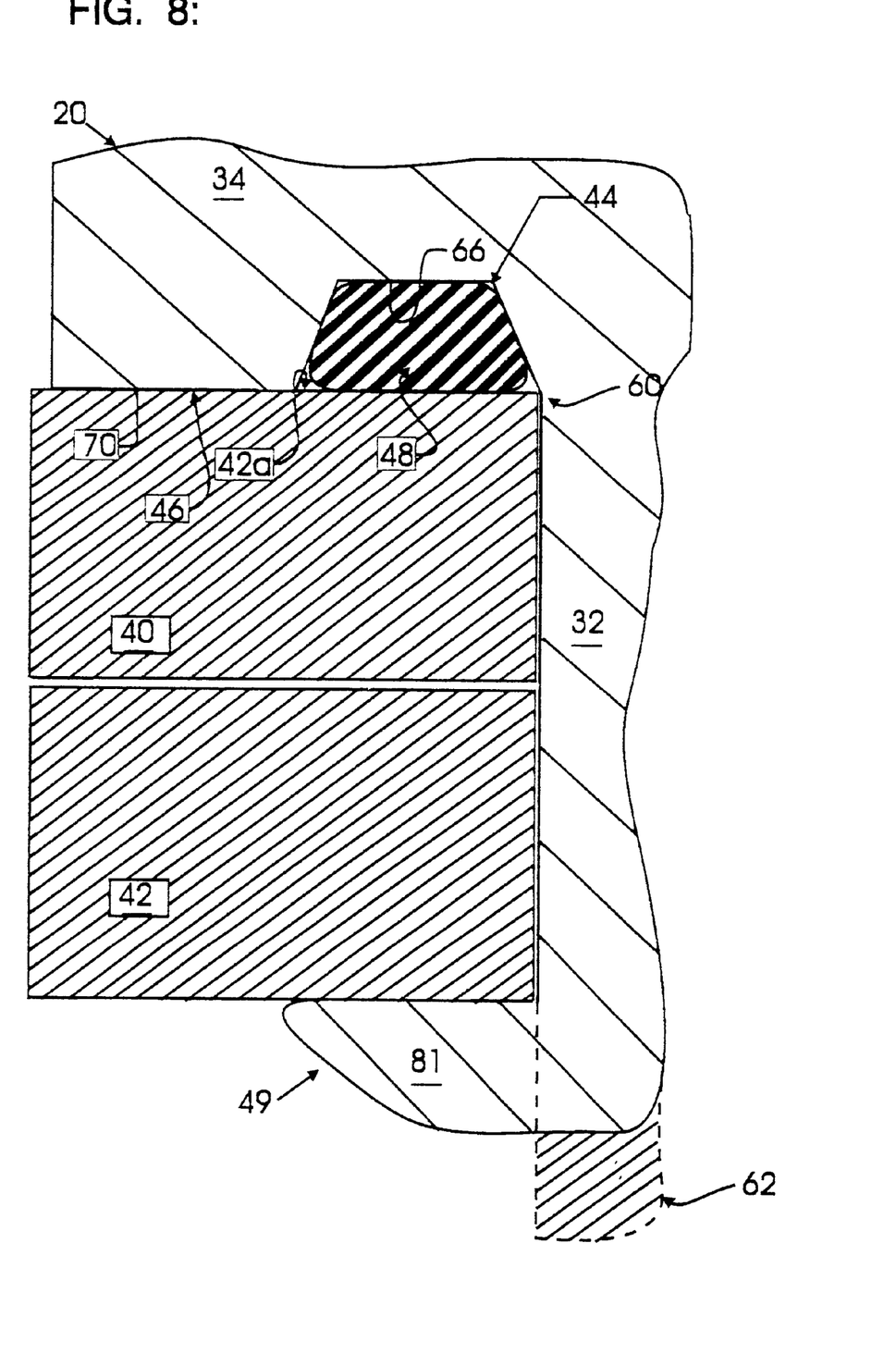
FIG. 8 is an enlarged view of a non-threaded self-sealing solid rivet that illustrates the sealing element in the trapezoid shaped groove and the sealing relationship with its mating part at complete engagement.

Referring now to the unthreaded self-sealing fastener 20 as illustrated in FIG. 8 of our drawings. This unthreaded fastener 20 contains a fastener head 34 that may vary considerably in dimension, style, or configuration. This fastener 20 may generally be considered as a solid rivet type self-sealing fastener 20 that is characterized by a vertically disposed unthreaded elongated shank 32 that extends axially from an enlarged fastener head 34 that contains an annular groove or channel 44 substantially similar to the shape of a trapezoid formed in the essentially flat undersurface 46 of the fastener head 34 and is combined there with a sealing element 48 (specifically an o'ring type elastomer). With the exception of the unthreaded fastener shank 32, this fastener 20 is substantially similar to the fastener 30 with the trapezoidal shaped groove 44 configuration as shown in FIGS. 2&3 of our drawings. Since the only difference between this fastener 20 and the fastener 30, as shown in FIGS. 2&3, is the way in which the fastener 20 is secured to the workpiece 42 instead of reiterating that which has already been described in detail, namely the groove 44 information as shown in FIGS. 2&3, we will instead focus on how this fastener 20 differs from the fastener 30 of FIGS. 2&3. This fastener 20 is designed to be inserted into a standard size unthreaded aperture 60 of a workpiece 42 in order to join the workpiece 42 with the workpiece 40 to make one component by forcing the workpiece 42 into full metal to metal engagement with the workpiece 40. The unheaded portion 62 of the fastener shank 32 extends beyond the unthreaded aperture 60 of the workpiece 42. This extended portion 62 of the fastener shank 32 would by the use of a solid rivet tool have pressure applied to both the extended portion 62 of the fastener shank 32 and the rivet head 34 simultaneously. This pressure causes the rivet shank 32 at the extended portion 62 to collapse up and outward against the workpiece 42 in the direction of the rivet head 34 securing the workpiece 40 with the workpiece 42, as the compressed material 49 forms the head 81 from the previously extended portion 62 of the rivet shank 32. At the same time the rivet head 34 is moved into complete metal to metal engagement with the workpiece 40, the head 81 is formed from the previously extended material 62 and moved into complete metal to metal engagement with the workpiece 42, thus securing the two workpieces and the rivet in place, while assuring a positive "seal line" with all sealed surfaces.

Figure 9:
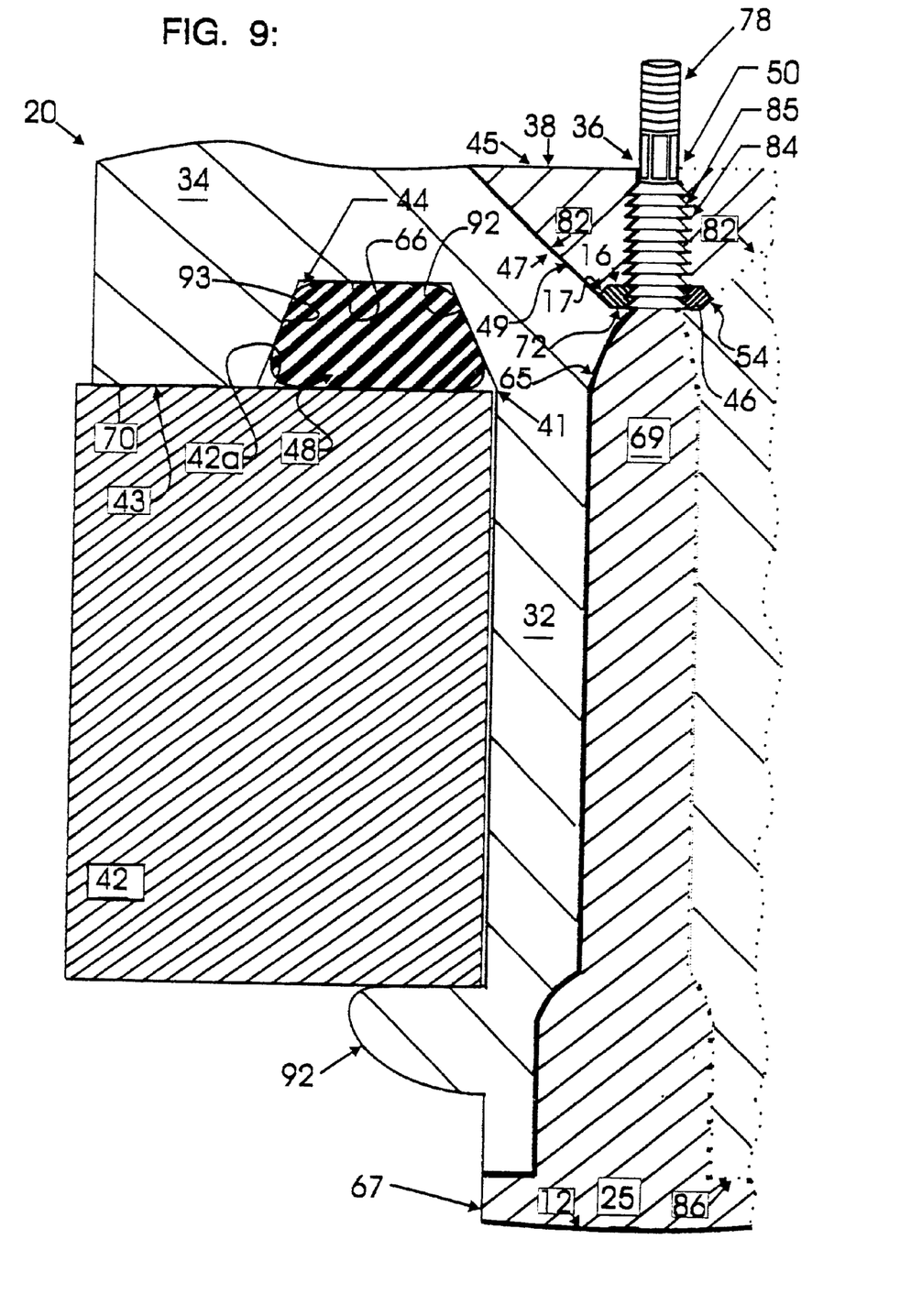
FIG. 9 is an enlarged view of a non-threaded structural self-sealing blind rivet that illustrates two separate sealing elements with trapezoidal shaped groove configurations similar to those as illustrated in FIGS. 2,3&6. Also illustrated is the sealing relationship with their respective mating parts at complete engagement.

Now referring to the blind rivet of FIG. 9. This unthreaded blind rivet 20 contains a fastener head 34 that may vary considerably in dimension, style, or configuration. This blind rivet 20 is generally considered as a structural flush break mechanically locked pull mandrel type self-sealing blind rivet 20 that is characterized by an unthreaded elongate shank 32 that extends axially from an enlarged fastener head 34 of a generally cylindrical arrangement. This blind rivet 20 assembly has an unthreaded aperture 65 through the nucleus of the blind rivet body 20. This unthreaded aperture extends vertically from the top of the rivet head 34 to the end of the rivet shank 32. This rivet 20 incorporates a mandrel 67 through the center of the aperture 65 in the blind rivet body 20. This mandrel 67 mates with a self-sealing locking collar 45 at the trapezoidal shaped indention 49 in the enlarged fastener head 34. A more detailed description is as follows; the mandrel 67 has a pre-formed head 25 having a semi-rounded cylindrical top surface 12 and a relatively flat under-surface 86. This mandrel 67 also has mating collar locking teeth 85 on the mandrel shank 69. These mating collar locking teeth 85 are angled down and out in the direction of the mandrel head 25 substantially in the order of 72 degrees. This mandrel shank 69 also has a threaded portion 78 at the end of the mandrel shank 69 opposite the mandrel head 25. This threaded portion 78 mates with a mandrel pull tool to apply pulling pressure to the rivet body 20. This pulling pressure draws the mandrel 67 away from the rivet head 34 causing the rivet shank 32 to be pulled through the aperture 65 forcing the rivet head 34 into complete engagement with the workpiece 42. The collar 45 is a generally cylindrical arrangement. The outer wall 82 of the collar 45 is inclined up and outward from the collar face 72 frusta-conically concentric with the axis of the unthreaded aperture 65 substantially in the order of 25 degrees. The inner wall 50 angle is substantially in the order of 90 degrees through the nucleus of the collar 45 and the locking teeth 84 are angled up and inward substantially in the order of 72 degrees in the direction of the nucleus of the unthreaded aperture 65 opposite the direction of the collar face 72. This collar face 72 has a groove or channel 54. This groove 54 is substantially similar to the nut groove 44 design as illustrated in FIG. 6. As the blind rivet 20 is mated with the workpiece 42, the mandrel 67 has a pulling pressure applied at the threaded portion 78 of the mandrel 67. This pressure pulls the mandrel 67 through the aperture 65 at the nucleus of the rivet body 20. At the same time the pressure is applied to the threaded portion 78, it is also applied to the collar 45 at the pull tool face 38 and at the mandrel undersurface 86 of the mandrel head 25. As this pressure is applied to the collar 45, it causes the collar 45 to engage with the mating locking teeth 85 of the mandrel 67 and pressure is also applied to the mandrel head 25. This causes the rivet shank 32 to collapse at a precalculated rate moving the material next to the workpiece 42 to form a head 92 at the workpiece 42 opposite the rivet head 34 and securing the rivet 20 to the workpiece 42. When this pressure is applied to the collar 45, it forces the collar 45 into complete engagement with the trapezoidal shaped indention 49 in the fastener head 34 and metal to metal contact between the mating wall surface 47 and the angled wall surface 82 of the collar 45 is achieved. As the collar 45 engages with the trapezoidal shaped indention 49 in the fastener head 34, the sealing element 46 (which is generally composed of but not limited to a rubber based composition and is ideally a torus in cross sectional configuration) is guided by the outer wall 17 of the groove 54 causing the sealing element to be compressed between the end wall surface 16 of the groove 54 and the collar face surface 72 in the rivet head 34. This groove 54 design in FIG. 9 is substantially similar to the groove 44 design as illustrated in FIGS. 4&6. The sealing element 46 volume in this design differs from that of the groove 44 design in FIGS. 2,3 & 5 as illustrated in that the mating collar locking teeth 85 of the mandrel 67 act as the inner wall of the groove 54 as illustrated in FIG. 9 of our drawings. Therefore, this design not only accounts for the volume of the actual groove 54 but also for the volume of the outward radial flow of the sealing element 46 into the mating collar locking teeth 85 of the mandrel 67. This assures that the sealing element 46 while being held captive in the groove 54 has a controlled inward radial flow into the nucleus of the rivet body 20 to connect into complete engagement with the mating collar locking teeth 85 of the mandrel 67 creating a positive seal. The distance between the end wall surface 16 of the groove 54 and the facing collar mating surface 72 is precisely calculated to apply pressure on the sealing element 46 and accounting for the inward radial flow of the sealing element 46 and the engagement of the sealing element 46, with the mating collar locking teeth 85 of the mandrel 67, the sealing element 46 squeeze would be a minimum of 25% assuring a continuous "seal line" between the sealed surfaces and a maximum squeeze of 40% to prevent sealing element 46 compression set thus maintaining a reliable seal.

As pressure is applied to the mandrel 67, the tensile stress required for separation of the mandrel 67 is achieved at the pre-calculated mandrel breaking area 36 and the mandrel 67 breaks off flush with the top of the rivet head 34. As the mandrel 67 breaks off flush with the rivet head 34, the locking teeth 84 of the collar 45 snap back and lock tight with the mating collar locking teeth 85 on the mandrel 67 into full metal to metal engagement. This in turn brings the rivet head 34 into full engagement with the workpiece 42. As previously stated this enlarged fastener head 34 contains a formed groove or channel 44 in the undersurface 41 of the said head 34 that incorporates a sealing element 48 that is held captive in the groove 44. Now describing the groove 44 as shown in FIG. 9. This groove 44 is substantially similar to that of the trapezoidal shaped groove 44 configuration as illustrated in FIGS. 2&3 of our drawings. From the periphery of the pitch diameter 41 the inner wall 92 of the groove 44 is inclined up and outward into the rivet head 34 frusta-conically concentric with the axis of the fastener shank 32 substantially in the order of 10 degrees forming the inner wall 92 of the groove 44, at this juncture the inner wall 92 intersects with the relatively flat end wall surface 66. This end wall surface 66 extends radially outward concentric with the axis of the fastener shank 32 and intersects with the outer wall 93 which declines down and outward frusta-conically concentric with the axis of the fastener shank 32 substantially in the order of 10 degrees ending at the undersurface of the rivet head 34, creating a groove 44 configuration that is substantially similar to the shape of a trapezoid. This trapezoidal shaped groove 44 configuration is incorporated with a sealing element 48 the material of which is generally composed of but not limited to a rubber or rubber based composition and is ideally a torus in cross sectional configuration. The inner wall 92 and the outer wall 93 of the groove 44 enter into the rivet head 34 to connect with the end wall surface 66 substantially equal in wall depth and degree of angle, the wall angles being substantially in the order of 10 degrees. This is vital to assure a proper seating of the sealing element 48 within the groove 44. The maximum sealing element 48 volume is substantially similar to the minimum volume of the trapezoidal shaped groove 44. This in conjunction with the inner wall 92 and the outer wall 93 of the groove 44 being substantially equal in wall depth and degree of angle forces the sealing element 48 to be equally distributed within the groove 44. As the sealing element 48 is compressed to its pre-calculated rate the sealing element 48 extends radially outward concentric with the axis of the fastener shank 32 being guided and held captive by the inner wall 92 of the groove 44 and the outer wall 93 of the groove 44 forcing the sealing element 48 into a perfect seat within the groove 44 and eliminating the possibility of installation damage as the rivet 20 is brought into complete engagement with the mating workpiece 42. A positive metal to metal engagement is achieved between the outer rim 70 of the rivet head 34 and the facing surface 42a of the workpiece 42. This eliminates sealing element 48 extrusion in this area and prevents the rivet 20 from backing away from the workpiece 42 as the rivet 20 is tightened into full engagement with the relative workpiece 42. The inside diameter of the sealing element 48 is slightly smaller than the inner wall 92 diameter of the groove 44 where the inner wall 92 intersects with the periphery of the pitch diameter 41 at the base of the groove 44 on the rivet shank 32. This causes the retention of the sealing element 48 in the groove 44 prior to engagement with mating workpiece 42. As previously stated the sealing element 48 is designed not to exceed the volume of the groove 44 by having a maximum sealing element 48 volume that would be substantially similar to the minimum volume of the trapezoidal shaped groove 44, keeping in mind the outward radial flow of the sealing element 48 so that the groove 44 would receive and accommodate the full volume of the sealing element 48. The sealing element 48 is compressed (squeezed) between the end wall surface 66 of the groove 44 and the facing surface 42a of the workpiece 42 to a percentage that is precisely calculated to apply pressure on the sealing element 48 making the sealing element 48 compression a minimum of 25%, this is the minimum compression force necessary to assure a continuous positive "seal line" between all sealed surfaces. A maximum sealing element 48 compression of 40% is necessary to maintain seal integrity. Keeping the sealing element 48 compression below the deflection endurance point of approximately 42% prevents sealing element 48 deformation and also retains the proper seal interface under compression assuring a continuous positive "seal line" between all sealed surfaces, and eliminating the possibility of compression set, as is common with excessive sealing element 48 compression (squeeze). Our design is created to maximize the optimum sealing performance of the sealing element 48, and to maintain seal integrity providing a completely reliable product.

We have described only the preferred form and application of our invention. It is intended that this present invention not be limited or restricted to the specific details as described herein, but that we reserve the right to any variations or modifications that may appear to those skilled in the art without departing from the spirit or scope of our invention as defined in the appended claims.

We claim the following:

1. A sealing nut, comprising:

a nut body, said nut body having a lower face for engaging a workpiece, said nut body having an inner bore extending through at least a portion of said nut body, said bore having an axis, and said lower face having a groove formed therein, said groove having an outer side wall extending upwardly from said lower face, at least a lower portion of said side wall being disposed remotely from and slanting outward from said axis as said side wall extends upward from said lower face.

2. The sealing nut of claim 1 further comprising a sealing element disposed at least partially within said groove.

3. The sealing nut of claim 2, wherein said groove has a first diameter where said outer side wall meets said lower face and said sealing element has an outer diameter which is greater than said first diameter of said groove so that said sealing element must be compressed to fit within said groove.

4. The sealing nut of claim 2 wherein said groove has an upper wall aligned substantially parallel to said lower face of said nut body, said side wall is extanding upward from and said lower face of said nut body to said upper wall of said groove.

5. The sealing nut of claim 2 wherein said side wall is disposed remotely from and slants outward from said axis of said bore as said wall extends upward from said lower face of said nut body to said upper wall of said groove.

6. The sealing nut of claim 2 wherein said bore is threaded.

7. The sealing nut of claim 5 wherein said side wall slants outward from said remote axis of said bore at an angle of approximately 20 degrees.

8. A sealing nut, comprising:

a nut body, said nut body having a lower face for engaging a workpiece, said nut body having an inner bore extending through at least a portion of said nut body, said bore having an axis, said lower face having a groove formed therein, said groove having an upper wall and an outer side wall, said outer side wall extending upwardly from said lower face of said nut body to said upper wall of said groove, said groove having a first diameter at a first location where said outer side wall intersects said lower face and having a second diameter at a second location above said first location, said first diameter being less than said second diameter, and a sealing element disposed at least partially within said groove.

9. The sealing nut of claim 8 wherein said second location is where said side wall intersects said upper wall.

10. The sealing nut of claim 8, wherein said sealing element has an outer diameter which is greater than said first diameter of said groove so that said sealing element must be compressed to fit within said groove.

11. The sealing nut of claim 8 wherein said upper wall is aligned substantially parallel to said lower face of said nut body, said side wall extends upward from said lower face of said nut body to said upper wall of said groove.

12. The sealing element of claim 11 wherein said side wall is disposed remotely from and slants outward from said axis of said bore as said side wall extends upward from said lower face of said nut body to said upper wall of said groove.

13. The sealing nut of claim 8 wherein said side wall is disposed remotely from and slants outward from said axis at an angle of approximately 20 degrees.

14. A fastener, comprising:

a head having a lower surface; and a shank extending from said lower surface of said head;

said head having a groove in said lower surface, said groove surrounding said shank at said lower surface of said head, said groove having an outer side wall extending upwardly from said lower surface, at least a lower portion of said outer side wall being disposed remotely from and slanting outward from said shank as said side wall extends upward from said lower surface.

15. The fastener of claim 14 further comprising a sealing element disposed at least partially within said groove.

16. The fastener of claim 15, wherein said groove has a first diameter where said outer side wall meets said lower surface and said sealing element has an outer diameter which is greater than said first diameter of said groove so that said sealing element must be compressed to fit within said groove.

17. The fastener of claim 16 wherein said groove has an upper wall aligned substantially parallel to said lower face of said nut body, said side wall extending upward from said lower face of said nut body to said upper wall of said groove.

* * * * *